United States Patent
Lubow

(10) Patent No.: US 7,380,717 B2
(45) Date of Patent: Jun. 3, 2008

(54) SYSTEM AND METHOD FOR COMPENSATING FOR BAR CODE IMAGE DISTORTIONS

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 0 days.

(21) Appl. No.: 11/036,454

(22) Filed: Jan. 14, 2005

(65) Prior Publication Data

US 2005/0150957 A1 Jul. 14, 2005

Related U.S. Application Data

(60) Provisional application No. 60/536,480, filed on Jan. 14, 2004.

(51) Int. Cl.
*G06K 7/10* (2006.01)
(52) U.S. Cl. .......................... 235/462.01; 235/462.03; 235/462.16
(58) Field of Classification Search ........... 235/462.01, 235/462.03, 462.07, 462.16, 487, 494; 283/74
See application file for complete search history.

(56) References Cited

U.S. PATENT DOCUMENTS

| 4,115,011 | A | * | 9/1978 | Brunsting ................... 356/246 |
| 4,864,112 | A | * | 9/1989 | Imai et al. .............. 235/462.01 |
| 4,914,828 | A | * | 4/1990 | Fiedor et al. .................. 33/554 |
| 5,015,832 | A | * | 5/1991 | Filipski et al. ......... 235/462.16 |
| 5,203,591 | A | | 4/1993 | Treat |
| 5,395,181 | A | * | 3/1995 | Dezse et al. ................ 400/103 |
| 5,552,593 | A | * | 9/1996 | Biss ........................... 235/495 |
| 5,825,947 | A | | 10/1998 | Sasaki et al. |
| 5,854,478 | A | * | 12/1998 | Liu et al. ............... 235/462.27 |
| 5,861,613 | A | * | 1/1999 | Apelberg et al. ........... 235/454 |
| 6,070,805 | A | | 6/2000 | Kaufman et al. |
| 6,088,482 | A | | 7/2000 | He et al. |
| 6,295,262 | B1 | * | 9/2001 | Kusumoto et al. ........ 369/53.37 |
| 6,527,181 | B1 | * | 3/2003 | Kleeberg et al. ........ 235/462.03 |
| 6,556,690 | B1 | * | 4/2003 | Nelson ....................... 382/100 |
| 2002/0190190 | A1 | * | 12/2002 | Miramonti et al. ....... 250/208.1 |

FOREIGN PATENT DOCUMENTS

| JP | 02-244293 | 9/1990 |
| JP | 03-085239 | 4/1991 |

OTHER PUBLICATIONS

International Search Report dated Jul. 27, 2005.

\* cited by examiner

*Primary Examiner*—Michael G. Lee
*Assistant Examiner*—Kumiko C. Koyama
(74) *Attorney, Agent, or Firm*—Davidson Berquist Jackson & Gowdey LLP

(57) ABSTRACT

The present invention generally relates to a system and method for modifying bars for applying to a non-flat, or irregular surface. A bar code symbol is created for and read from a non-flat or irregular surface by compensating for distortions caused by the non-flat or irregular surface.

12 Claims, 6 Drawing Sheets

SYSTEM AND METHOD FOR COMPENSATING FOR BAR CODE IMAGE DISTORTIONS

This application claims the benefit of U.S. provisional patent application No. 60/536,480, filed on Jan. 14, 2004, entitled, "Scannable Virtual Bar Code Image Compensating for Distortions", and incorporated herein by reference.

BACKGROUND OF INVENTION

1. Field of the Invention

The present invention generally relates to a system and method for modifying bars and spaces in a bar code symbol. Specifically, the bars in a bar code are modified for applying the bar code symbol to a non-flat, or irregular surface. In particular, the present invention is directed to creating and reading a bar code symbol on an irregular surface by compensating for distortions caused by the non-flat or irregular surface. By creating a compensated bar code, by applying a compensated bar code symbol upon, and by reading a bar code symbol applied to a non-flat surface, bar codes may be now applied on and read from many surfaces heretofore unable to be bar coded.

2. Description of the Related Art

There is a great need in manufacturing to provide machine-readable information. Bar code technology is the most economical, popular means to provide that machine-readable data. Bar code symbologies of various types have been developed to meet the specific needs of different activities including manufacturing warehouse storage, shipping, and merchandising.

In its simplest form, a bar code is a series of printed vertical bars and spaces, applied in one way or another to a surface, that are read by a scanner as digital information. In any case, the successful reading of a bar code relies on several factors. Most scanners "read" by projecting many thousands of pulses of light in a line across the code. The bars and spaces are of regular widths (all multiples of a Unit-Measure or X-Dimension). Bars and spaces are defined by a degree of contrast, and absorb or reflect these pulses accordingly. The scanner tallies these "yes" or "no" signals as binary digits to be translated by the scanner's software into the information encoded.

In order for this to happen successfully, the scanner's projected pulses of light must meet the surface upon which the bar code is imprinted at a constant angle, so that a constant relationship exists between the width of a bar or space and the number of pulses of light it reflects. This means that the bar code must be printed on a flat surface. Of course, not every surface is flat and, as a result, there are obvious limits to where (and to what) a bar code can be applied.

The Uniform Code Council (UCC), part of the UCC/EAN writes the global bar code standards for UPC and EAN bar codes and has addressed various readability issues. The most robust codes, (binary codes), have only two bar thicknesses ("Thick" and "Thin") and can be read successfully despite bar width variations of up to 50%. The bars of a standard UPC, however, have four distinct thicknesses and are much less tolerant of dimensional error. Because the error allowance is a percentage, the code becomes more and more prone to readability problems as its size decreases. Thus, the UCC specifies the minimum width of a UPC, for example, as just over 1 inch. In a similar way, the UCC standard for maximum curve across the bars of a bar code is a function of the size of the bar code. According to the UCC, a bar code may occupy no greater than 60° of the circumference of a cylinder. For this reason, typically, the smallest cylinder to which a UPC can be applied is just over 6" in circumference.

There are wide variety of other technical challenges to applying and reading bar codes on products. Many products on a productive line have irregular non-flat surfaces, such as ribbed, cylindrical or spherical. It is quite difficult to apply a bar code to these surfaces that are not flat. That is, if a standard bar code is applied to an irregular surface, the bars of the bar code appear to the scanner to be distorted when they are applied to these surfaces. The spaces between these bars will necessarily also be distorted. Such distortions can make the bar code either subject to reading errors or entirely unreadable.

Accordingly, there is therefore a great need in the art for a device and way by which to apply bars and spaces of a bar code to an irregular, or non-flat surface. There is a concomitant need in the art for a way by which to read bar codes from an irregular or non-flat surface.

Accordingly, there is now provided with this invention an improved method and system for effectively overcoming the difficult and longstanding problems inherent in creating, applying, and reading bar codes on irregular, non-flat surfaces. These problems have been solved in a highly effective way to compensate for distortions caused by these surfaces.

SUMMARY OF THE INVENTION

According to one aspect of the invention, a system is described for creating a compensated bar code from a desired standard bar code. The compensated bar code is applied onto a curved surface. The system has a means for determining the radius of the curved surface. The system also has a means for changing the dimensions of bars and spaces of the standard bar code as a function of the distance from the center of the bar code on the curved surface. In this way, when the compensated bar code is applied to the curved surface, the compensated bar code has compensated for distortion caused by the curved surface and may be read by a scanner.

Another aspect of the present invention is a system for reading a bar code that has been distorted by its application to a curved surface. The system has a means for determining the radius of the curved surface. The system also has a means for altering standard reading of the dimensions of bars and spaces of the bar code as a function of the distance from the center of the bar code on the curved surface for compensating for the distortion. In this way, the bar code is able to be read by a scanner.

Another aspect of the present invention is a method of creating a compensated bar code from a desired standard bar code for applying the compensated bar code onto a curved surface. The method includes determining the radius of the curved surface and changing the dimensions of bars and spaces of the standard bar code as a function of the distance from the center of the bar code on the curved surface, so that when the compensated bar code is applied to the curved surface to the curved surface, the compensated bar code has compensated for distortion caused by the curved surface and may be read by a scanner.

A still further aspect of the invention includes a method of reading a bar code that has been distorted by its application to a curved surface. The method comprises determining the radius of the curved surface and altering standard reading of the dimensions of bars and spaces of the bar code as a function of the distance from the center of the bar code on the curved surface for compensating for the distortion, so that the bar code is able to be read by a scanner.

As still further aspect of the present invention is a method of creating a compensated bar code from a desired standard bar code for applying the compensated bar code onto a non-flat surface. The method comprises determining the mathematical equation describing the non-flat surface and changing the dimensions of the bars and spaces of the standard bar code as a function the mathematical equation. In this way, when the compensated bar code is applied to the non-flat surface, the compensated bar code has compensated for distortion caused by the non-flat surface and may be read by a scanner.

Another still further aspect of the present invention is a method of reading a bar code that has been distorted by its application to a non-flat surface. This method comprises determining the mathematical equation describing the non-flat surface and altering the standard reading of the dimensions of the bars and spaces of the bar code as a function of the mathematical equation for compensating for the distortion, so that the bar code is able to be read by a scanner.

As will be appreciated by those persons skilled in the art, a major advantage provided by the present invention is to be able to create bar codes for products having a non-flat surface. It is therefore an object of the present invention to modify bars in a bar code symbol so that a bar code symbol may be applied to non-flat surfaces. It is another object of the present invention to read bar codes from a non-flat surface. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, where.

DESCRIPTION OF THE PREFERRED EMBODIMENT

The following preferred embodiment as exemplified by the drawings is illustrative of the invention and is not intended to limit the invention as encompassed by the claims of this application. A system and method for creating bar codes for a non-flat surface and for reading bar codes from a non-flat surface is disclosed herein.

When a normal bar code is applied to the surface of a cylinder, for example, the image gets distorted since the distance and angle from the bar code scanner to the bar code continually changes. If the cylinder is small enough in diameter, the dimension of a unit bar (as the scanner perceives it) will vary across the length of the code to unacceptable degrees.

It has now been found that to solve this problem, compensation can occur in one of at least two ways, each utilizing the same basic system and method. The solution outlined below is based upon the radius of the cylinder to which the bar code is to be applied. Of course, a similar solution could be applied to any regular surface, non-flat surface. Regular, here refers to that surface able to be described by a mathematical equation.

Figure 1:
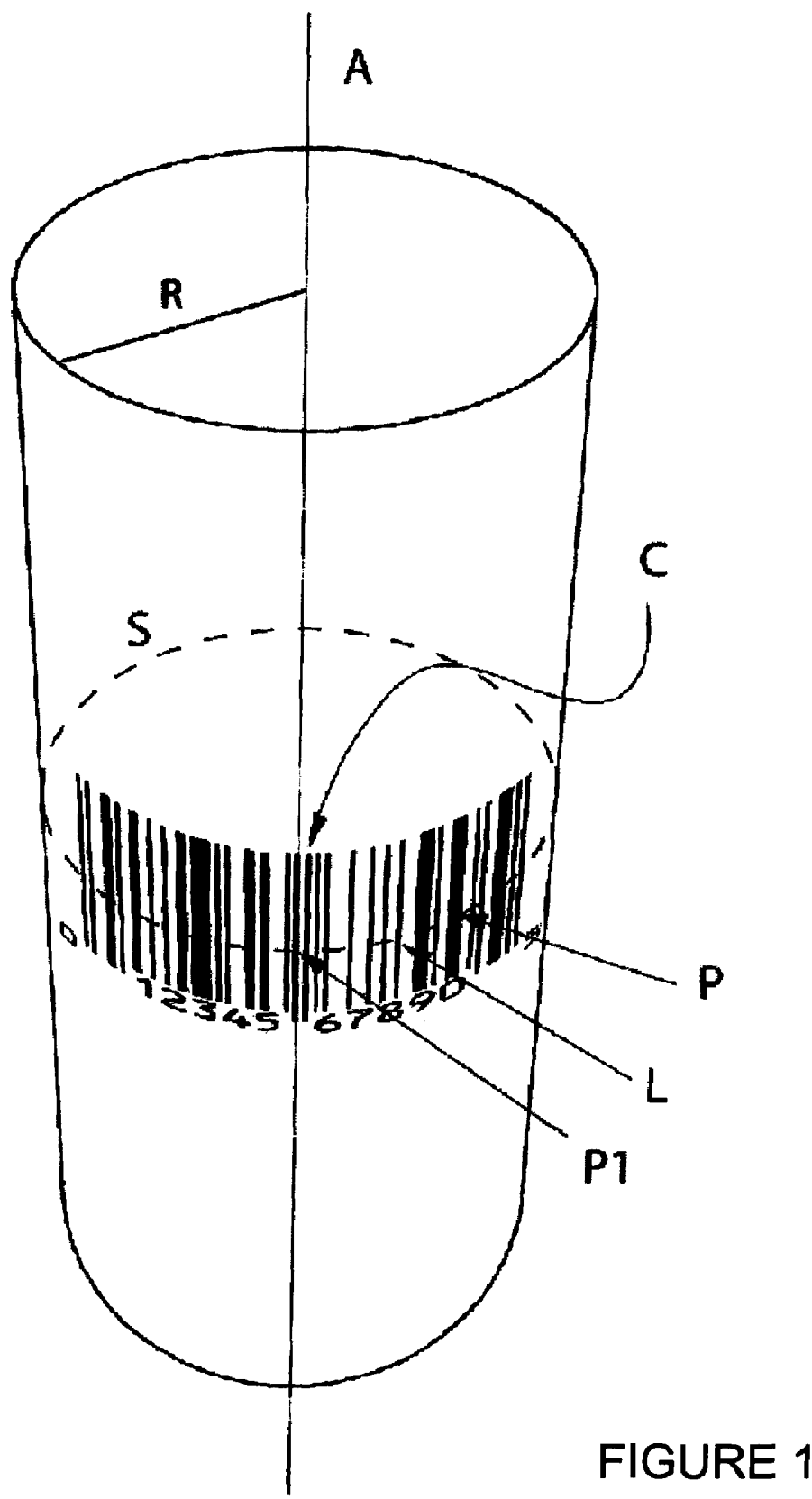
FIG. 1 is an orthogonal depiction of a cylinder having a bar code placed thereon.

As shown in FIG. 1, there is a cylinder with radius R. There is a bar code graphic in a rectangular shape and one of the sides of the graphic is smaller than the diameter of the cylinder (2R). The graphic may be transformed or modified in such a way that when the result is applied to the surface of the cylinder, its projection back to a flat surface is the same as the original. The result of this is that a bar code reader, positioned normally, will successfully read the code.

Figure 2:
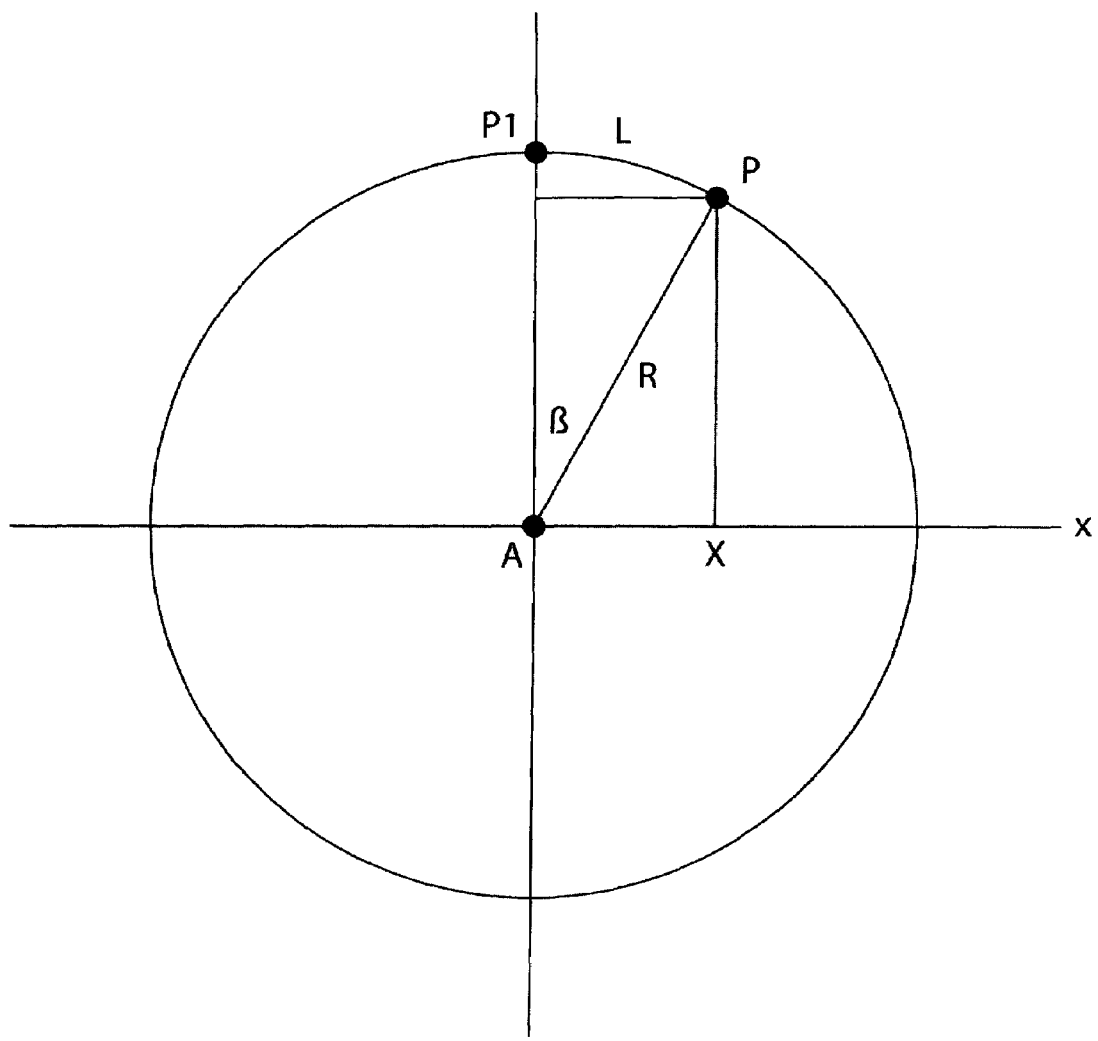
FIG. 2 is a cross section of the cylinder shown in FIG. 1.

A is the axis and C is the central line of the resulting graphic when it is applied to the surface of the cylinder, which is parallel to A. S is a sectional line passing the graphic. P1 is the intersection of C and S. P is an arbitrary point on S and on the graphic. Now, L, the distance or the arc length between P1 and P is what in question. If this is solved, any point on the original graphic will have a determined new value for its distance to C in the resulting graphic. To solve this problem, FIG. 2 illustrates the section where A, P1, and P can be seen. The problem is to get the value of L by the given R and X which is the x-value of P, or the projection of P, on the x-axis. By using the following equations, the bar code may be distorted as a function of the distortion caused by the non-flat surface:

$$\sin \beta = X/R$$

$$\beta = \arc\sin (X/R)$$

$$L = \oplus R = \arc\sin(X/R)R$$

β is the angle between A-P and A-P1. L thus serves as a factor by which the locations of each point in the original (unaltered) bar code graphic can be changed to produce the distortion.

In one embodiment of this invention, the system and method of the present invention can be used for creating the bar code, thus producing a distorted code that scans normally once it is applied to a cylindrical surface.

Figure 3:
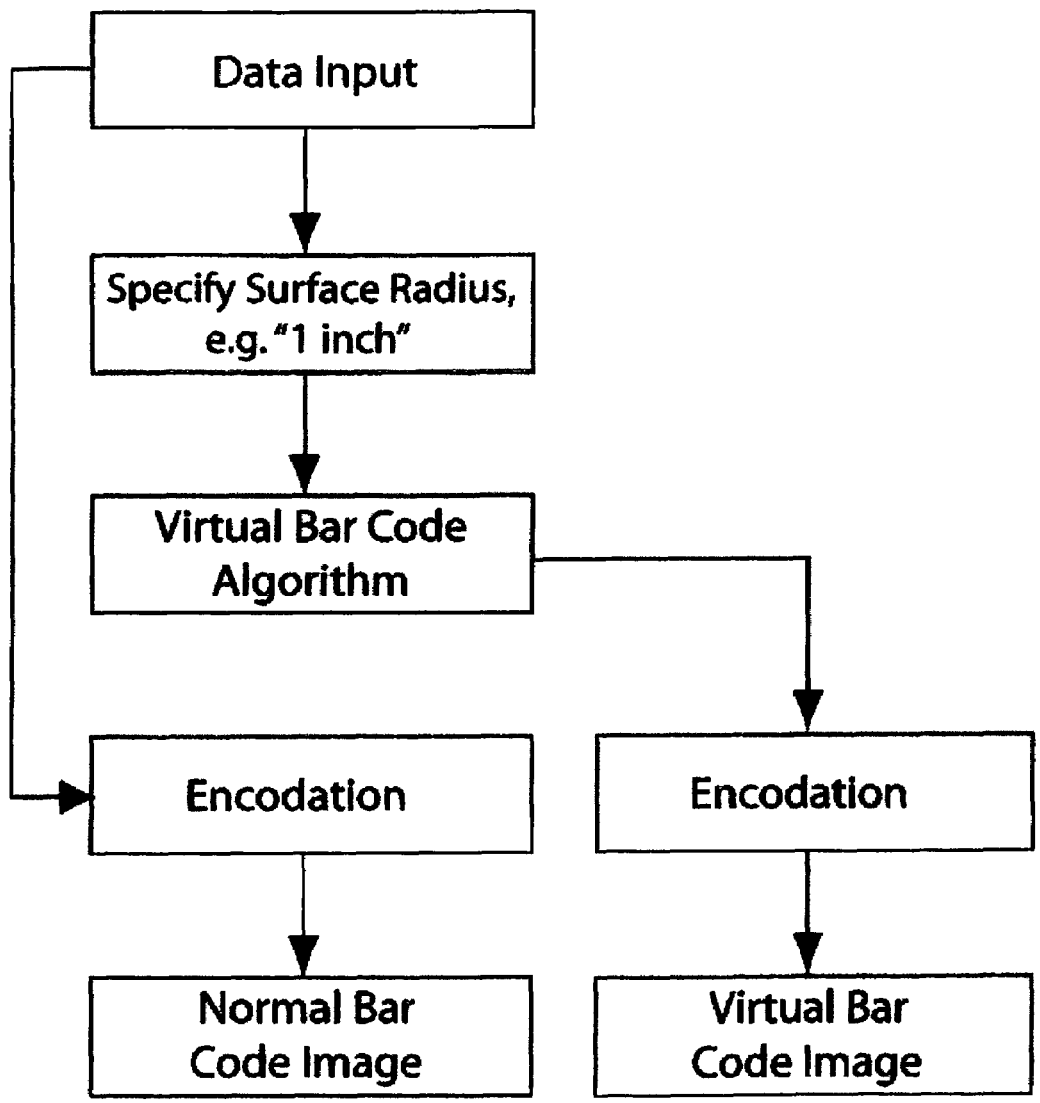
FIG. 3 is a flow chart illustrating the steps involved in creating the compensated bar code of the present invention.

Following the flow chart depicted in FIG. 3, the data that is to be transformed into a bar code is imprinted into the system. This data is then encoded. Encodation entails transforming given data input to an image of bar code—i.e. bars and spaces—the location and relative sizes of which are mapped graphically by any known bar code creation software for creating a standard or normal bar code image.

The non-flat surface upon which the bar code is to be applied is then determined. It may be physically measured, or, more likely, has been specified at an earlier point in time as part of the overall specifications of the package or product. In this example, the non-flat surface is the surface of a cylinder, which has a specified radius of 1 inch. By applying a 1 inch radius to $$\sin \beta = X/R$$

$$\beta = \arc\sin(X/R)$$

$$L = \beta R = \arc\sin(X/R)R$$

a compensated bar code is created, thereby remapping the locations and relative sizes of the bar code elements by processing them as a function of the radius of the surface to which the bar code will be applied. In this way, the normal bar code image is distorted in a predetermined way so that when the created compensated bar code image is viewed perpendicularly, the compensated bar code has compensated for the distortion caused by the curved surface. Existing bar code software typically includes input fields for symbology, linear and 2-D data input, target printer resolution, X-Dimension and Bar Width Reduction. Now, the radius of the curved surface can also be considered. As shown in FIG. 3, a bar code graphic can now be produced which is distorted as a function of the radius entered.

Of course, a bar code graphic in accordance with the present invention could also be produced which is a function of any non-flat regular surface. To produce a bar code image for any regular, mathematically described non-flat surface, as many points as necessary to produce a readable bar code image must be hypothetically plotted on this surface. As is well known to those skilled in the art, the preceding example of a cylinder is merely a particular example of the general example that will follow. The surface and subsequent formulae are described as follows.

Suppose $S=S(x,y)$ is an arbitrary continuous and single-valued surface (no holes or undercuts); that is, for any given $(x,y)$ there is a determined value of $S(x,y)$, and for any given $(x,y)$ and $(x1,y1)$, $S(x,y)' S(x1,y1)$ if $x' x1$ or $y' y1$.

For any given point X, there is a value x. X is the distance from the origin to x. X1, meanwhile, is the distance from the origin along the surface $S(x,y)$ to X. Likewise, for any given point Y, there is a value y. Y is the distance from the origin to y. Y1, meanwhile, is the distance from the origin along the surface $S(x,y)$ to Y.

An image can be generated on this surface by using the formula $F(x)=x1$ and the formula $G(y)=y1$. When a graphic is created for applying to S for subsequent reading by a reading device, it should preferentially be created on a different surface S1 (where S1 is flat and for any point $(x,y)$ on S we draw it on S1 with the coordinates $(x1,y1)$). When this graphic is then read after it is applied to S, the reader perceives the projection of the drawn graphic as the original, undistorted, graphic.

Figure 4:
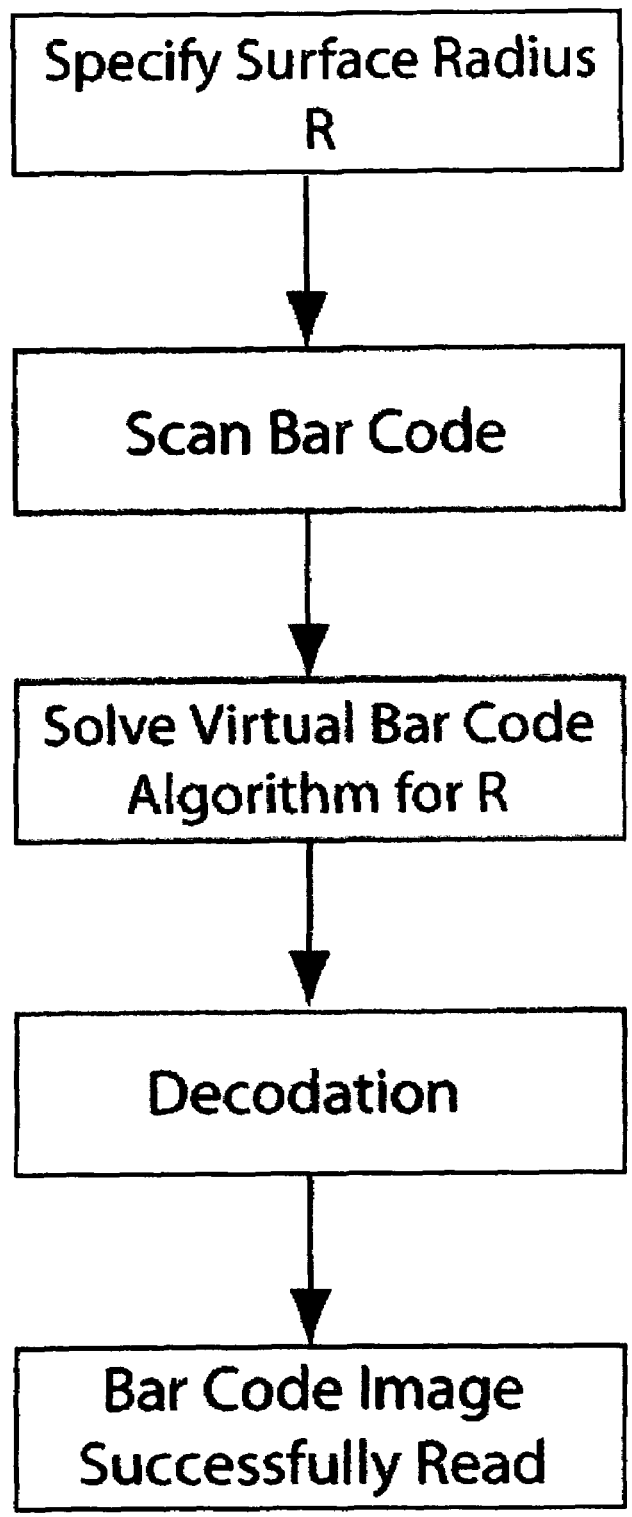
FIG. 4 is a flow chart illustrating the steps of the present invention involved in reading a distorted bar code when the surface radius has been specified.
Figure 5:
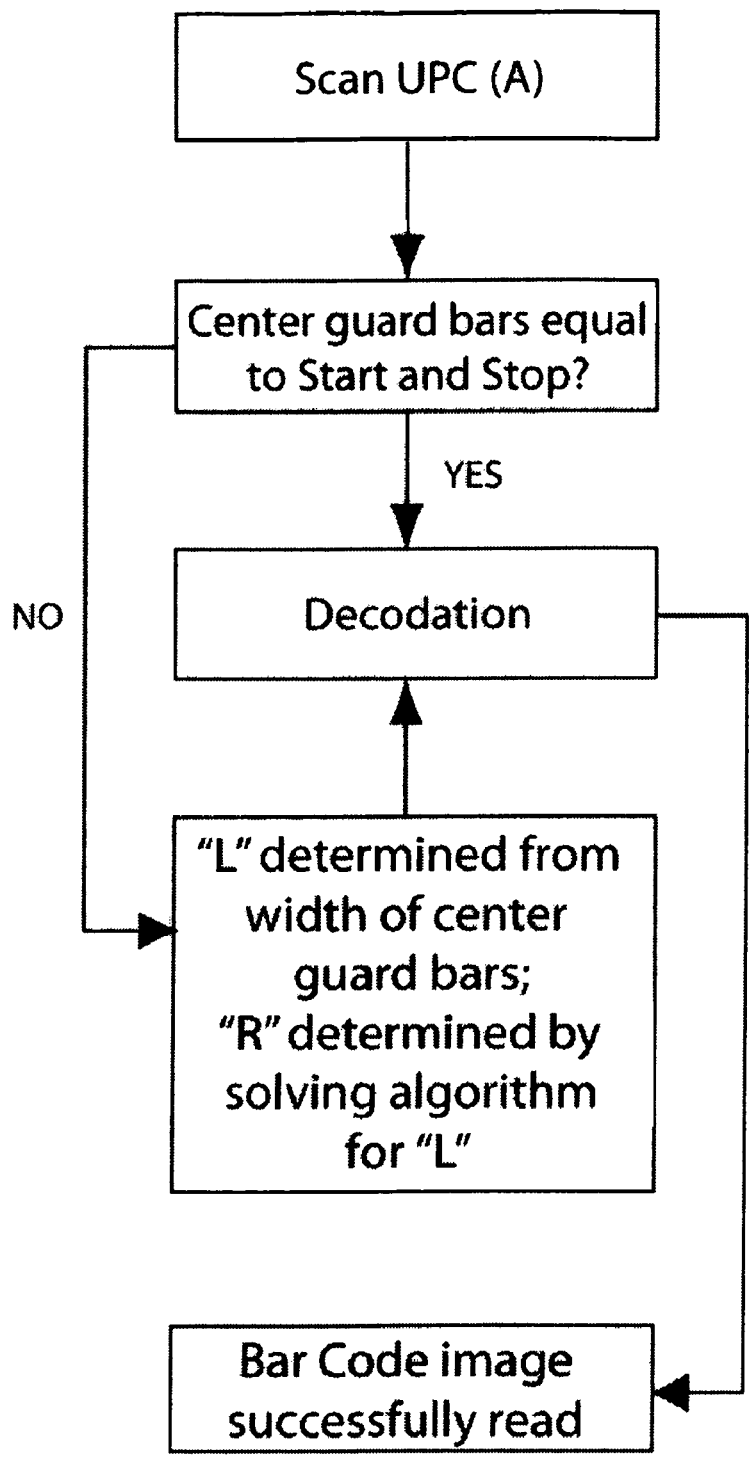
FIG. 5 is a flow chart illustrating the steps of the present invention involved in reading a distorted bar code when the surface radius is unknown.

In another embodiment of this invention, as shown in FIGS. 4 and 5, the system and method of the present invention can be used for reading a normal bar code, that has been distorted by its placement on a non-flat surface.

A scanner can be taught to correct for distortion in UPC (A) (and other bar codes of fixed length) by examining the guard bars in the center of the code. FIG. 4 illustrates how the scanner can read the distorted bar code when the radius has been previously specified into the system. Based on the dimensions of these bars the scanner can determine the total length of the code (in unit-bars), were it not distorted, and thus a value for L in the algorithe diagramed above. Solving this equation in reverse, the radius (R) and arc angle (β) could be determined and the distorted bar code could be re-mapped and correctly read.

As illustrated in FIG. 5, this may, in one example, be a procedure wherein either the radius is initially unknown, or is contingent on a bar code not reading correctly at first. The procedure would not guarantee a good read but instead better equips the scanner to read codes previously thought "unreadable". In other examples, the radius may be first inputted into the scanner so that a normal bar code, that has been distorted by its placement on a non-flat surface is readable.

BAR CODE CREATION EXAMPLE

It is to be understood that the following example of the present invention is not intended to restrict the present invention since many more modifications may be made within the scope of the claims without departing from the spirit thereof.

Typically, the designer is provided with dimensions and specifications for the package. In this example, the package is taken to be a small cylindrical can which is to be bar-coded with a UPC (A). The designer is asked to design a label 1" tall, to be wrapped around the can. The can itself is 4" tall and has a 1" diameter.

The designer realizes that, a UPC (A) being 1.25" at minimum width, the most common orientation of the bar code will not work (this would be "ladder-style", with the bars horizontally spanning the curved surface). The label is not tall enough to fit the code, so the designer decides to rotate the bars 90° and to use the invention described herein to distort the code for readability.

Using the disclosed invention, the designer specifies UPC (A) as the symbology, the numeric data, X-dimension, and specifies the radius as one inch. Of course, both the nomenclature and the units may be altered to fit the designer's whim or to adhere to any other necessary specification to which the bar code must satisfy.

Figure 6A:

By using the system and method described, a distorted bar code graphic is created that the designer then places in his design. The code, despite its unorthodox orientation, is readable by ordinary scanners. The bar code in FIG. 6A is a normal UPC(A) graphic.

Figure 6B:

The bar code in FIG. 6B is the same UPC (A) graphic, altered by the system and method of the present invention for making the bar code readable when wrapped around a cylinder 1 inch in diameter. Although to the naked eye it is hard to distinguish between the altered and unaltered code, the altered code, on a flat surface (such as a sheet of paper) is in fact unreadable unless wrapped around a cylinder of the correct proportions.

BAR CODE READING EXAMPLE

Another option utilizing the system and method for the present invention is to program a scanner with the method of the present invention and have the scanner apply it as it interprets the data read. One way to implement this feature smoothly within the normal procedure of reading a bar code would be to program the scanner to first determine the degree of distortion and then to correct for its distortion by applying the method of the present invention into the reading capabilities of a scanner.

For example, typically a scanner looks for "START" and "STOP" characters in a pattern of bars and spaces to determine the symbology. In the case of UPC (A), it sees three pairs of thin "guard bars" at the beginning, middle, and end of the code. In normal (undistorted) UPCs these three pairs of bars are identical. However, when the UPC is applied to a curved surface the START and STOP pairs of guard bars are distorted a certain amount relative to the center pair, according to the radius of the curve. The scanner can now be programmed to determine this radius mathematically prior to reading so that the scanning reader may correct for the distorted data for thereby making a successful read (see the flow chart of FIG. 5).

Apart from these solutions described, there are other ways to use the same invention to correct for other types of distortions. The semispherical bottom of a test tube, for example, would distort a bar code in more directions than would a simple curve, but this distortion is no less scrutable mathematically. When this shaped is mathematically applied to the system and method of the present invention a properly compensated bar code is created. Of course, any mathematical formulation describing a non-flat surface may be used for creating compensated bar codes which are adaptable to nearly every surface.

Although the particular embodiments shown and described above will prove to be useful in many applications in the bar code symbol imprinting art to which the present invention pertains, further modifications of the present invention will occur to persons skilled in the art. All such modifications are deemed to be within the scope and spirit of the present invention as defined by the appended claims.

What is claimed is:

1. A system for reading a bar code that has been distorted by its application to a curved surface, comprising:
    a) a bar code reader for (a) determining the radius of the curved surface by determining a distance between guard bars contained within said bar code and (b) determining whether the distance between the guard bars is the same as a distance between a second set of guard bars, wherein lines representing each of the bar widths of said bar code have the same respective line widths across the whole bar code; and
    b) means for altering standard reading of the dimensions of bars and spaces of said bar code as a function of the distance between the guard bars of said bar code and the distance flour the center of said bar code on the curved surface for compensating for the distortion, so that said bar code is able to be correctly decoded by the bar code reader, wherein the means for altering alters the standard reading dimensions when the distance between the guard bars is not the same as the distance between the second set of guard bars.

2. The system of claim 1, wherein said guard bars at a center of said bar code.

3. The system of claim 2, wherein further comprising means for determining a total length of the bar code had the bar code not been distorted by the curved surface.

4. The system of claim 1, wherein said means for altering comprises a computer processor.

5. A method of reading a bar code that has been distorted by its application to a curved surface, comprising:
    a) determining the radius of the curved surface by (a) determining a distance between guard bars contained within said bar code of said bar code using a bar code reader, wherein lines representing each of the bar widths of said bar code have the same respective line widths across the whole bar code and (b) determining whether the distance between the guard bars is the same as a distance between a second set of guard bars; and
    b) altering standard reading of the dimensions of bars and spaces of said bar code as a function of the distance between the guard bars of said bar code and the distance from the center of said bar code on the curved surface for compensating for the distortion when the distance between the guard bars is not the same as the distance between the second set of guard bars, so that said bar code is able to be correctly decoded by the bar code reader.

6. The method of claim 5, wherein said guard bars comprise guard bars at a center of said bar code.

7. The method of claim 5, wherein said altering step comprises altering standard reading of the dimensions of bars and spaces of the bar code using a computer processor.

8. The method as claimed in claim 5, wherein the altering standard reading of the dimensions of bars and spaces of the bar code comprises determining a total length of the bar code had the bar code not been distorted by the curved surface.

9. A method of reading a bar code that has been distorted by its application to a non-flat surface, comprising:
    a) determining a mathematical equation describing the non-flat surface by determining a distance between of guard bars contained within said bar code using a bar code scanner and determining whether the distance between the guard bars is the same as a distance between a second set of guard bars, wherein lines representing each of the bar widths of said bar code have the same respective line widths across the whole bar code; and
    b) altering standard reading of the dimensions of the bars and spaces of the bar code as a function of the distance between the first and second portions guard bars of said bar code and the mathematical equation for compensating for the distortion, so that said bar code is able to be correctly decoded by the bar code scanner, wherein the standard reading dimensions are altered when the distance between the and bars is not the same as the distance between the second set of guard bars.

10. The method of claim 9, wherein said guard bars comprise guard bars at a center of said bar code.

11. The method of claim 9, wherein said altering step comprises altering standard reading of the dimensions of bars and spaces of the bar spaces of the bar code using a computer processor.

12. The method as claimed in claim 11, wherein the altering standard reading of the dimensions of bars and spaces of the bar code comprises determining a total length of the bar code had the bar code not been distorted by the non-flat surface.

\* \* \* \* \*